United States Patent [19]

Hackenberg et al.

[11] 3,845,493

[45] Oct. 29, 1974

[54] FEELER DEVICE FOR ENGAGING A FILM PERFORATION TO STOP FILM TRANSPORT

[75] Inventors: Hubert Hackenberg; Siegfried Zobel, both of Munich, Germany

[73] Assignee: Agfa-Gevaert Aktiengesellschaft, Leverkusen, Germany

[22] Filed: Mar. 21, 1974

[21] Appl. No.: 453,373

[30] Foreign Application Priority Data

Mar. 27, 1973 Germany.............................. 2315178

[52] U.S. Cl.................. 354/213, 354/206, 242/71.4
[51] Int. Cl....................... G03b 19/04, G03b 17/28
[58] Field of Search.................... 354/213, 212, 206; 242/71.4

[56] References Cited
UNITED STATES PATENTS
3,774,513   11/1973   Ettischer et al................. 354/213 X Primary Examiner—Robert P. Greiner
Attorney, Agent, or Firm—Michael S. Striker

[57] ABSTRACT

A still camera for use with roll film having a row of perforations, one for each film frame, wherein a feeler penetrates into an oncoming perforation shortly prior to completion of film transport by the length of a frame and allows an arresting lever to engage and stop a positioning wheel at the exact moment when the transport of film by the length of a frame is completed. The arresting lever thereby shifts the feeler so that the latter is centered in the respective perforation and does not pull or push the film during the making of an exposure. The film transporting mechanism has a reciprocable input member which is moved from a starting position to an end position during a first stage of film transport by the length of a frame, which is thereupon retracted to a first intermediate position short of the starting position, which is thereupon again moved toward but short of the end position to complete the transport of film by the length of a frame, and which is thereupon retracted to its starting position. The positioning wheel rotates back and forth in response to movements of the input member and carries a displacing stud which disengages the arresting lever from the positioning wheel when the input member returns to its starting position.

12 Claims, 4 Drawing Figures

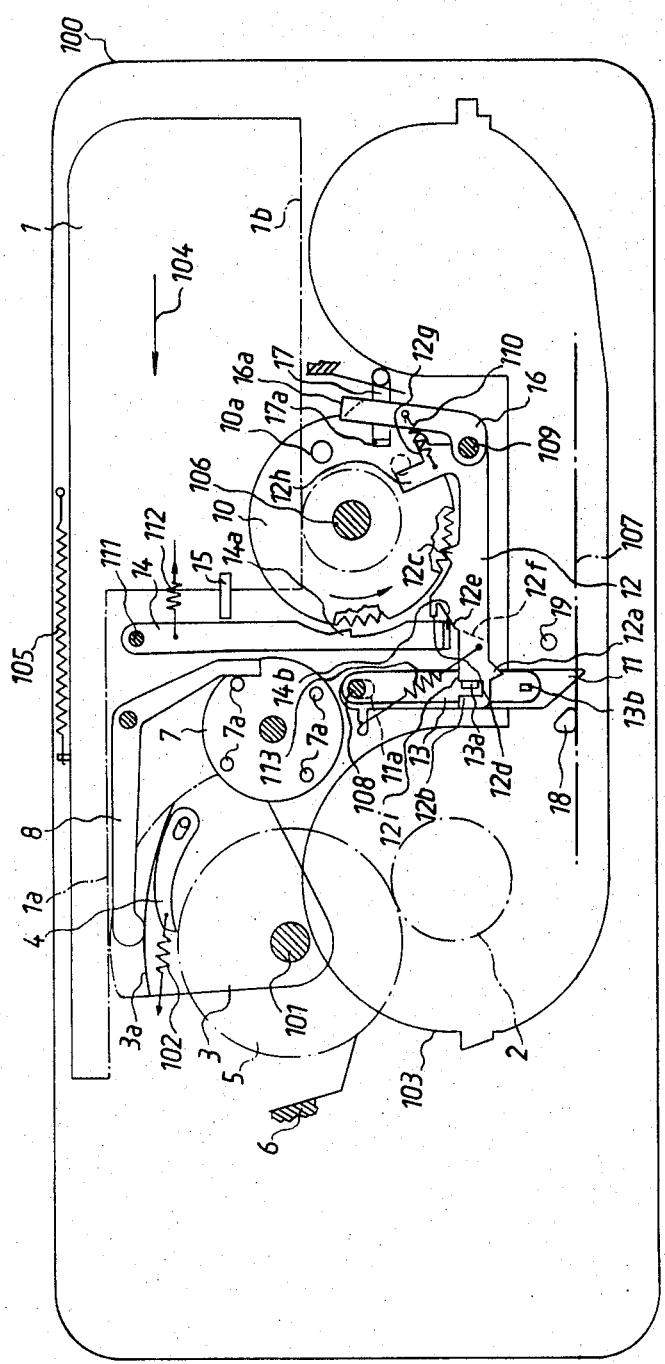
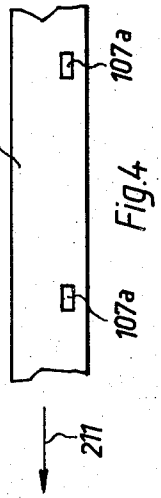
Fig. 3
Fig. 4

FEELER DEVICE FOR ENGAGING A FILM PERFORATION TO STOP FILM TRANSPORT

BACKGROUND OF THE INVENTION

The present invention relates to photographic apparatus, especially to still cameras, and more particularly to improvements in photographic apparatus for use with roll film having a row of perforations, one for each film frame, preferably for use with roll film which is confined in a cassette or an analogous receptacle. In such photographic apparatus, a feeler bears against the film and penetrates into an oncoming perforation during actuation of the film transporting mechanism to thereby initiate the stoppage of film transport at the exact moement when the foremost unexposed film frame registers with the picture taking lens.

A drawback of presently known cameras which employ a feeler is that the feeler is likely to subject the film to at least some stresses during the making of exposures, i.e., that the feeler either pushes or pulls the film upon completion of film transport by the length of a frame. Moreover, the device or devices for arresting the film transporting mechanism upon penetration of the feeler into an oncoming perforation are rather complex and unreliable; they must be machined and assembled with a high degree of precision in order to insure that the forward progress of film is terminated at the exact moment when the foremost unexposed film frame is in register with the lens.

SUMMARY OF THE INVENTION

An object of the invention is to provide a photographic apparatus, especially a still camera, wherein the film is neither pulled nor pushed during the making of exposures in spite of the fact that the apparatus employs a feeler which penetrates into an oncoming perforation of the film shortly before or at the exact moment when the foremost unexposed film frame moves into register with the picture taking lens.

Another object of the invention is to provide a novel and improved film transporting mechanism for still cameras which are used with photographic roll film having a row of perforations, one for each film frame.

A further object of the invention is to provide a still camera of the above outlined character wherein the camera release can be actuated without producing pronounced camera shake and wherein a reduction or elimination of camera shake is not attributable exclusively to the construction and/or mode of operation of the camera release.

An additional object of the invention is to provide a still camera wherein the manually operable portion of the film transporting mechanism is freed for movement upon completion of film transport by the length of a frame and prior to the making of an exposure so that the freeing of manually operable portion need not take place during the making of an exposure and thus cannot contribute to camera shake.

The improved photographic apparatus is designed for use with photographic roll film having a row of perforations, one for each film frame, and preferably constitutes a still camera for use with roll film which is stored in containers or magazines (e.g., in containers of the type known as drop-in cassettes). The apparatus comprises a housing having a chamber for a supply of roll film, film transporting means having input means movable back and forth and being operative to advance the film in the housing lengthwise in response to movement in a predetermined direction, positioning means which is movable in the housing in response to movement of the input means, a feeler which is mounted in the housing to engage the film and to penetrate into an oncoming perforation of the film while the input means is operated to advance the film, arresting means which is movably installed in the housing and serves to arrest the positioning means (and hence the movement of input means in a direction to advance the film) in response to penetration of the feeler into the oncoming perforation upon completion of film transport by the length of a frame, means for moving the input means counter to the predetermined direction, and means for disengaging the arresting means from the positioning means in response to movement of the input means counter to the predetermined direction upon completion of film transport by the length of a frame.

The arresting means comprises a tooth or analogous means for centering the feeler in the adjacent perforation in response to disengagement of the arresting means from the positioning means. For example, the feeler may comprise a lug or an analogous portion, and the centering means may constitute a tooth or another portion of the arresting means and engages the lug in response to disengagement of arresting means from the positioning means to thereby maintain the feeler in a predetermined position with respect to the perforation into which the feeler extends. In such predetermined position, the feeler is preferably spaced apart from the leading and trailing ends of the perforation into which the feeler extends.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a similar shcematic plan view but showing the input means in a second intermediate position upon completion of film transport by the length of a frame but before the input means returns to its starting position; and FIG. 4 is a plan view of a portion of photographic film which can be used in the camera of FIGS. 1 to 3.

DESCRIPTION OF THE PREFERRED EMBODIMENTS

Figure 1:
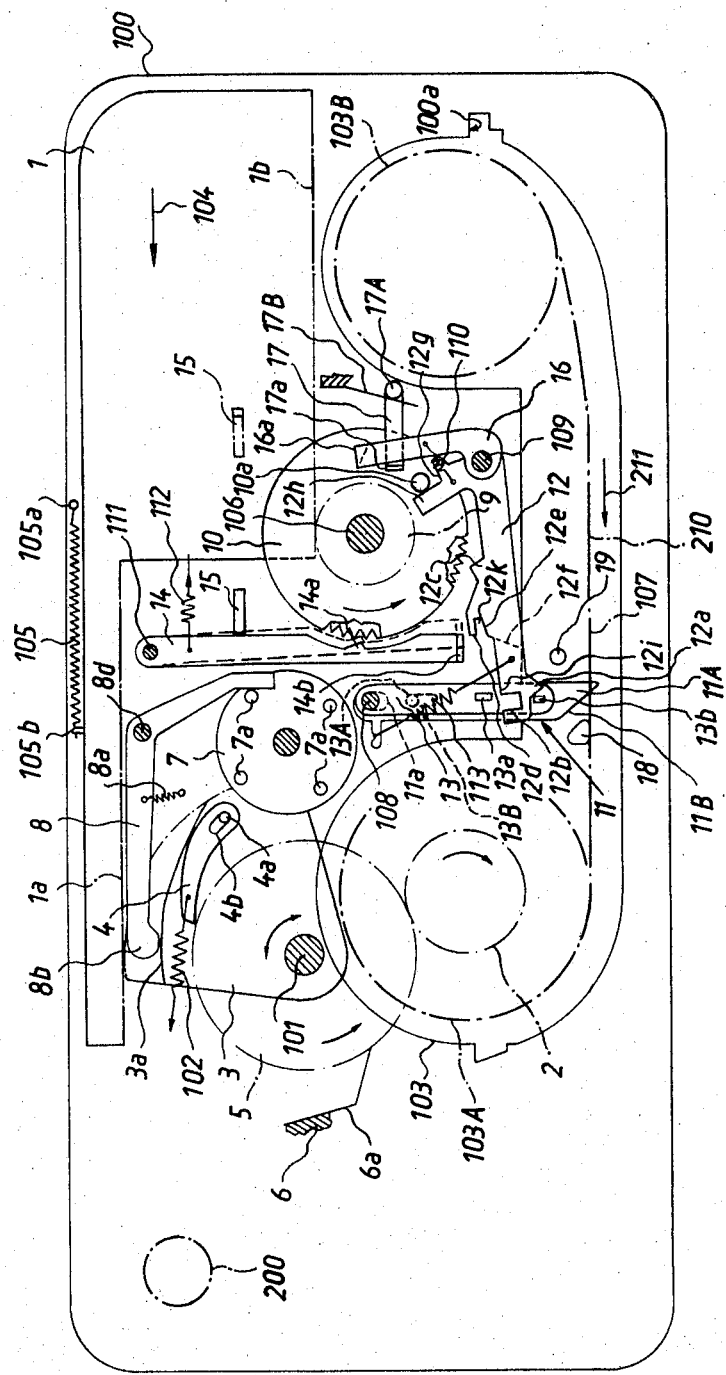
FIG. 1 is a schematic plan view of a still camera which embodies the invention, with the input means in a starting position it assumes upon completion of film transport by the length of a frame.

Referring to FIG. 1, there is shown a still camera having a housing or body 100 which is provided with a chamber 100a for a drop-in cassette or magazine 103 containing a supply of roll film 107. The takeup reel 103A in the cassette 103 is connected or integral with a small gear 2 which is moved into mesh with a gear 5 of the film transporting mechanism in the housing 100 when the cassette 103 is properly inserted into the chamber 100a. The film 107 has a row of perforations 107a (see FIG. 4), one for each film frame.

The film transporting mechanism further comprises a reciprocable input member 1 which is movable in the housing 100 back and forth in and counter to the direction indicated by arrow 104 and is permanently biased to the starting or first end position of FIG. 1 by a helical return spring 105. The latter reacts against a post 105a of the housing 100 and is attached to a post 105b of the input member 1. The input member 1 has a first elongated toothed rack 1a which meshes with a gear segment 3 of the film transporting mechanism. This segment is rotatable on or with a shaft 101 which is journalled in the housing 100 and further supports the gear 5 in such a way that the gear 5 can rotate relative to the gear segment 3 or vice versa.

The gear segment 3 has a convex cam face 3a which is tracked by a follower 8b at the free end of one arm of a bell crank lever 8 constituting a means for indexing a socket 7 for multiple flash lamp holders, e.g., multiple flash lamp holders of the type known as flashcubes or magicubes. The indexing lever 8 is pivotable on a shaft 8d in the housing 100, and the follower 8b is biased against the cam face 3a by a weak helical spring 8a. The gear segment 3 of the film transporting mechanism is further provided with a pivot member 4a for a pawl 4 which is biased by a helical spring 102 so that its pallet engages the adjacent tooth of the gear 5. When the input member 1 moves forwardly in the direction indicated by arrow 104, the rack 1a rotates the gear segment 3 counterclockwise, as viewed in FIG. 1, whereby the pallet of the pawl 4 transmits torque to the gear 5 which rotates the gear 2 so that the takeup reel 103A in the cassette 103 draws film from the supply reel 103B. The pawl 4 has a relatively short slot 4b for the pivot member 4a of the gear segment 3. The gear 5 is held against rotation in a clockwise direction, as viewed in FIG. 1, by an elastic pawl 6a (e.g., a suitably configurated leaf spring) which is attached to a bracket 6 in the housing 100.

That side of the socket 7 which faces away from the observer of FIG. 1 is formed with a customary (usually cruciform) recess which can receive the foot of a multiple flash lamp holder. The socket 7 is indexible through angles of 90 degrees to thereby place successive flash lamps of a multiple flash lamp holder into an optimum position for illumination of a subject or scene.

The film transporting mechanism including the parts 1, 1a, 3, 4 and 5 is constructed and assembled in such a way that the transport of roll film 107 by the length of a frame necessitates a second forward movement of the input member 1 after the input member completes a forward movement from the starting or first end position of FIG. 1 to a second end position (while moving toward the second end position, the input member 1 advances in the direction indicated by the arrow 104). The rack 1a then rotates the gear segment 3 counterclockwise, and the pallet of the pawl 4 causes the gear 5 to share such angular movement of the gear segment 3 so that the gear 2 rotates clockwise and the core of the takeup reel 103A collects exposed film. The user of the camera relaxes the pressure or pull upon the input member 1 when the latter reaches its second end position whereby the spring 105 contracts and automatically returns the input member 1 toward the starting position of FIG. 1. However, the camera comprises a control means which prevents the input member 1 from returning all the way to the starting position of FIG. 1 upon completion of the first forward stroke (arrow 104). While the input member 1 moves in a direction to the right, as viewed in FIG. 1, the rack 1a rotates the gear segment 3 clockwise but the pallet of the pawl 4 merely rides over the teeth of the gear 5 so that the gear 2 is at a standstill. When the input member 1 reaches a first intermediate position under the action of the spring 105, it is moved again in the direction indicated by arrow 104 but the transport of film 107 by the length of a frame is completed before the input member 1 reaches its second end position. When the pressure or pull upon the input member 1 is thereupon relaxed or terminated, the spring 105 automatically returns the input member all the way to the starting or first end position of FIG. 1. Thus, the transport of film 107 by the length of a frame necessitates (a) a movement (arrow 104) of the input member 1 from the starting position of FIG. 1 and all the way to the second end position, (b) a return movement of the input member 1 under the action of the spring 105 from the second end position to a first intermediate position (i.e., short of the starting position of FIG. 1), and (c) a movement of the input member 1 (arrow 104) from the first intermediate position to a second intermediate position (i.e., short of the second end position). The input member 1 thereupon returns to the starting position of FIG. 1 under the action of the spring 105.

Figure 2:
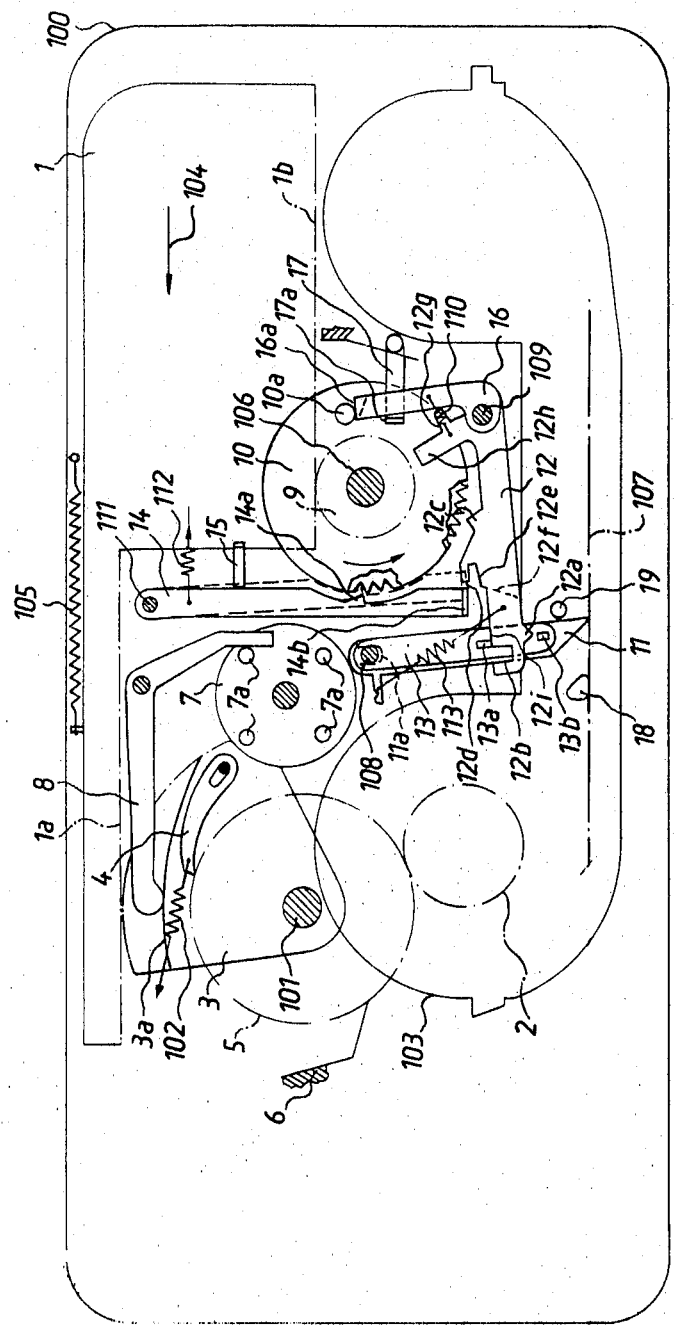
FIG. 2 is a similar schematic plan view but showing the input means in a first intermediate position upon partial completion of film transport by the length of a frame.

During movement of the input member 1 from the starting position of FIG. 1 to the second end position, the cam face 3a causes the right-hand arm of the lever 8 to engage one of four equidistant projections or pins 7a on the socket 7 and to index the socket through 90 degrees in a counterclockwise direction, as viewed in FIG. 1. The pin 7a which is to be engaged and moved by the right-hand arm of the indexing lever 8 assumes the 1½ o'clock position, as viewed in FIG. 2. When the input member 1 thereupon performs a second forward stroke (arrow 104) to move from the first to the second intermediate position and to thereby complete the transport of film 107 by the length of a frame, the right-hand arm of the indexing lever 8 cannot reach the next-following pin 7a even though such pin dwells in the 1½ o'clock position, so that the socket 7 is indexed only once during each transport of the film 107 by the length of a frame. However, the right-hand arm of the indexing lever 8 is agains ready to engage the pin 7a in the 1½ o'clock position when the input member 1 returns all the way to the starting position of FIG. 1, i.e., upon completion of movement of the input member from the first to the second intermediate position and subsequent to movement of the input member under the action of the spring 105. It will be seen that the socket 7 can be indexed only in response to the first forward stroke of the second input member 1, namely, when the input member leaves the starting position of FIG. 1.

The camera further comprises a positioning member 10 which insures that the film portion between the reels 103A and 103B cannot and does not tend to move lengthwise during the making of an exposure. Such exposure is made in response to deformation of a diaphragm 200 (indicated by a phantom-line circle) which forms part of the camera release and whose deformation initiates a movement of the shutter to its open position. The positioning member 10 is a gear which is rotatable on or with a shaft 106 mounted in the housing 100. The positioning member 10 forms part of a gear cluster which further includes a pinion 9 in mesh with a second toothed rack 1b of the input member 1. A pin-shaped disengaging projection or stud 10a is rigid or integral with the positioning member 10, and this member rotates counterclockwise when the input member 1 is caused to move against the opposition of the spring 105.

The housing 100 contains a fixedly mounted pivot member 108 for a pivotable scanning member 11 whose tip 11A penetrates into an oncoming perforation 107a of the film 107 while the gear 2 rotates clockwise in response to movement of the input member 1 from the first to the second intermediate position. The pivot member 108 extends through an elongated slot 11a of the scanning member 11 so that the latter is free to pivot on as well as to reciprocate (within limits) relative to the pivot member 108. The member 108 further supports a pivotable slide 13 which is coupled to this scanning member 11 by a pin-and-slot connection 13A, 13B so that the parts 11, 13 share all angular movements but the scanning member 11 is free to move lengthwise of the slide 13. The latter comprises two projections or lugs 13a, 13b. The parts 11, 13 together constitute a feeler for the perforations 107a of roll rilm 107.

The path for the film 107 between the reels 103A and 103B is indicated by a phantom line 210. The housing 100 contains an expelling device in the form of a ramp 18 which is adjacent to the path 210 and cooperates with an inclined edge face 11B of the scanning member 11 to automatically expel the tip 11A from the adjacent perforation 107a while the film 107 moves forwardly (arrow 211) in response to movement of the input member 1 from the starting position of FIG. 1 to the second end position.

A further fixedly mounted pivot member 109 in the housing 100 supports a pivotable arresting lever 12 and a pivotable control lever 16. The levers 12, 16 are coupled to each other by a helical spring 110 which tends to maintain a distancing projection or lug 12g of the arresting lever 12 in abutment with the adjacent edge face of the control lever 16. The arresting lever 12 further comprises a centering portion or tooth 12a which is shown as being adjacent to the lug 13b of the slide 13, a notch or recess 12b which is located opposite the tooth 12a and can receive the lug 13a of the slide 13, a blocking or arresting protuberance or tooth 12c which can engage the adjacent teeth of the positioning member 10, two cam faces 12e, 12f, a stop 12d, a follower 12h, and an edge face 12i adjacent to the recess or notch 12b. The free end of the control lever 16 is formed with an edge face of platform 16a.

An elastic or rigid retaining lever 17 is mounted in the housing 100 on a pivot pin 17A and comprises a bent-over end portion or stop 17a which can be engaged by the adjacent edge face of the control lever 16. A leaf spring 17B serves as a brake to prevent accidental pivoting of retaining lever 17 on the pivot pin 17A. The stop 17a determines the extent of counterclockwise pivotal movement of the control lever 16 under the action of the coupling spring 110.

A further fixedly mounted pivot member 111 in the housing 100 supports a one-armed lever 14 which is biased counterclockwise, as viewed in FIG. 1, by a helical spring 112 tending to maintain a tooth 14a of the lever 14 in mesh with the adjacent teeth of the positioning member 10. The lever 14 can be pivoted from the broken-line to the solid-line position of FIG. 1 by an element 15 of the camera shutter; the element 15 is movable between the phantom-line and solid-line positions of FIG. 1. A bent-over lug or projection 14b at the lower end of the lever 14 can be engaged by the stop 12d of the arresting lever 12.

A helical spring 113 couples the arresting lever 12 with the scanning member 11 and tends to pivot the feeler 11, 13 in a counterclockwise direction, as viewed in FIG. 1.

The picture taking lens (not shown) is mounted in or on the housing 100 in front of the foremost unexposed frame of the film 107, i.e., substantially in the region of the pivot member 111 and spring 105, as viewed in FIG. 1.

The operation is as follows:

If the shutter is cocked (preferably in response to transport of the film 107 by the length of a frame), the element 15 assumes the solid-line position of FIG. 1. The camera is then ready to make an exposure, i.e., the user can effect an opening of the shutter by deforming the diaphragm 200 whereby the picture taking lens admits scene light against the foremost unexposed film frame between the reels 103A, 103B in the cassette 103. The shutter closes automatically after elapse of a preselected interval of time whereby the element 15 moves from the solid-line to the phantom-line position of FIG. 1 and allows the spring 112 to pivot the lever 14 from the solid-line to the broken-line position so that the tooth 14a engages the adjacent tooth of the positioning member 10 and holds the later against rotation in a clockwise direction. The lug 14b at the lower end of the lever 14 moves to the broken-line position of FIG. 1 so that it is located in the path of clockwise movement of the stop 12d on the arresting lever 12.

When the foremost unexposed frame of the film 107 is located behind the picture taking lens, the tip 11A of the scanning member 11 extends into the adjacent perforation 107a. The centering tooth 12a of the arresting lever 12 bears against the lug 13b of the slide 13 and maintains the feeler 11, 13 in a predetermined angular position in which the tip 11A is located between the leading and trailing ends of the adjacent perforation 107a in the film 107, i.e., the tip 11A does not contact any of the surfaces surrounding such perforation 107a and the feeler 11, 13 cannot shift the film lengthwise in response to deformation of the diaphragm 200. In other words, the film 107 is neither pulled nor pushed by the feeler 11, 13 when the camera is ready to make an exposure. In order to be capable of maintaining the feeler 11, 13 in such predetermined angular position (through the medium of the centering tooth 12a), the follower 12h of the arresting lever 12 abuts against the disengaging stud 10a of the positioning member 10. The disengaging stud 10a invariably assumes the predetermined angular position of FIG. 1 when the input member 1 returns to the starting position upon completion of forward transport of the film 107 by the length of a frame. When the disengaging stud 10a maintains the arresting lever 12 in the angular position of FIG. 1, the arresting tooth 12c is disengaged from the adjacent teeth of the positioning member 10.

If the user thereupon wishes to make a second exposure, the film 107 must be transported by the length of a frame. To this end, the user pushes or pulls the input member 1 in the direction of arrow 104 so that the input member stresses the spring 105 and moves all the way to its second or lefthand end position. This results in certain angular displacement of the takeup reel 103A; however, such angular displacement does not suffice to complete the transport of film 107 by the length of a frame. During the initial stage of movement of film 107 in the direction indicated by arrow 211, the trailing edge of the surface bounding the perforation 107a which receives the tip 11A causes the feeler 11, 13 to pivot clockwise about the fixed pivot member 108 whereby the edge face 11B engages and slides along the inclined surface of the expelling ramp 18 so that the tip 11A is withdrawn from the adjacent perforation 107a and the feeler 11, 13 stresses the spring 113.

Furthermore, when the input member 1 leaves the starting position of FIG. 1 and moves in the direction indicated by arrow 104, the rack 1b rotates the positioning member 10 counterclockwise, as viewed in FIG. 1 (note that the tooth 14a of the lever 14 merely holds the positioning member 10 against rotation in a clockwise direction and that the arresting tooth 12c is still disengaged from the positioning member). Consequently, the disengaging stud 10a moves away from the follower 12h but the arresting tooth 12c is still unable to engage and arrest the positioning member 10 because the stop 12d of the lever 12 moves into abutment with the lug 14b of the lever 14 (the lug 14b is assumed to dwell in the broken-line position of FIG. 1 because the element 15 of the shutter has been permitted to move to the phantom-line position in response to actuation of the camera release including the diaphragm 200) before the tooth 12c can arrest the positioning member 10.

As soon as the tip 11A of the scanning member 11 is withdrawn from the adjacent perforation 107a of the film 107, the spring 113 is free to contract and to pivot the feeler 11, 13 counterclockwise, as viewed in FIG. 1, until the feeler reaches and is arrested by a fixed abutment 19 in the housing 100. Moreover, and as the input member 1 continues to move toward its second end position, the element 15 of the shutter returns from the phantom-line position of FIG. 1 to the solidline position (see also FIG. 2) so that the tooth 14a of the lever 14 is disengaged from the positioning member 10. Thus, the shutter is cocked during movement of the input member 1 from the starting position of FIG. 1 to the second end position so as to permit the positioning member 10 to rotate clockwise during movement of the input member from the second end position to the first intermediate position of FIG. 2. The edge face 121 of the arresting lever 12 abuts against the lug 13a of the slide 13 because the lug 13a is located well to the right of the notch 12b since the feeler 11, 13 engages the abutment 19.

While the input member 1 moves from the second end position toward the first intermediate position under the action of the spring 105, the positioning member 10 rotates clockwise and is arrested (to thereby arrest the input member 1 in the first intermediate position) when the disengaging stud 10a engages the edge face 16a of the control lever 16. A comparision of the position of displacing stud 10a in FIGS. 1 and 2 indicates the distance between the starting and first intermediate positions of the input member 1. The stud 10a pivots the control lever 16 clockwise while the positioning member 10 rotates counterclockwise in response to movement of the input member 1 from its starting position whereby the control lever 16 stresses the spring 110 and moves temporarily away from the stop 17a and distancing lug 12g.

The input member 1 is thereupon again advanced in the direction indicated by arrow 104. The mounting of the spring 113 is such that the feeler 11, 13 is not only biased against the abutment 19 but that the tip 11A is also urged against the front side of the film 107 which moves in the direction indicated by arrow 211. Therefore, the tip 11A automatically penetrates into the oncoming perforation 107a of film 107 shortly before the mechanism 1, 1a, 3, 5 completes the transport of film by the length of a frame. The tip 11A penetrates into the oncoming perforation 107a shortly before the input member 1 reaches its second intermediate position so that the advancing film 107 entrains the tip 11A and thereby pivots the feeler 11, 13 clockwise, i.e., away from the abutment 19 and toward the expelling ramp 18. The forward movement of film 107 and input member 1 is terminated when the lug 13a slides off the edge face 12a of the arresting lever 12 (note that the slide 13 pivots with the scanning member 11) because the lug 13a is then in register with the notch 12b and allows the arresting tooth 12c of the lever 12 to engage and hold the positioning member 10 against further movement in a counterclockwise direction. The tooth 12c engages the positioning member 10 in response to clockwise pivoting of the arresting lever 12 so that the notch 12b moves upwardly and receives the lug 13a of the slide 13. The input member 1 then dwells in the second intermediate position (short of the second end position) and is ready to return to the starting position of FIG. 1 under the action of the spring 105. The arresting lever 12 is pivoted clockwise (to move the tooth 12c into engagement with the positioning member 10) under the action of the spring 113 which thereby causes the distancing projection 12g to pivot the control lever 16 clockwise so that the edge face 16a is moved away from the path of movement of the disengaging stud 10a back toward the position shown in FIG. 1. The arresting tooth 12c merely holds the positioning member 10 against rotation in a counterclockwise direction, as viewed in the drawing, but allows the member 10 to rotate clockwise while the input member 1 returns to the starting position of FIG. 1. The element 15 of the shutter holds the lever 14 in the solid-line position so that the tooth 14a is also disengaged from the positioning member 10. FIG. 3 shows the parts of the camera in positions they assume upon completed transport of film 107 by the length of a frame but prior to movement of the input member 1 back to the starting position of FIG. 1.

As the input member 1 thereupon moves back to the starting position (counter to the direction indicated by arrow 104 and in response to contraction of the spring) 105, the positioning member 10 rotates clockwise and causes the disengaging stud 10a to reengage the follower 12h of the arresting lever 12. This takes place shortly before the input member 1 reaches the starting position so that the disengaging stud 10a pivots the arresting lever 12 counterclockwise whereby the centering tooth 12a engages the lug 13b and centers the tip 11A in the respective perforation 107a so that the feeler 11, 13 is disengaged from the film 107. The stud 10a also disengages the tooth 12c from the positioning member 10 and causes the stop 12d to return to the position shown in FIG. 1 in which the arresting lever 12 cannot prevent the lever 14 from pivoting counterclockwise under the action of the spring 112 as soon as the element 15 of the shutter leaves the solid-line position of FIG. 1. Thus, all parts reassume the solid-line positions of FIG. 1 and the camera is ready to make an exposure in response to renewed deformation of the diaphragm 200.

An important advantage of the improved camera is that the film 107 need not be engaged by any cameramounted parts during the making of exposures. This is effected by the arresting lever 12 whose tooth 12a automatically centers the tip 11A through the medium of the lug 13b on the slide 13 so that the tip 11A is disengaged from the surfaces bounding that perforation 107a into which the feeler 11, 13 extends. Consequently, the feeler 11, 13 can neither pull nor push the film 107 and the foremost unexposed film frame can be properly located in the focal plane of the picture taking lens to thereby insure the making of satisfactory exposures.

The user of the camera can readily note whether or not the transport of film 107 by the length of a full frame is completed because the input member 1 can return to the starting position of FIG. 1 only when the foremost unexposed film frame is in accurate register with the picture taking lens. Thus, by looking at the position of the input member 1, the user knows whether or not the input member has returned from the second end position (incomplete film transport) or from the second intermediate position (upon completion of film transport by the length of a frame).

Another advantage of the improved camera is that, in spite of the relatively complex nature of manipulation of the film transporting mechanism (repeated movement of the input member 1 in the direction of arrow 104), a relatively small number of parts participate in actual transport of the film and in disengagement of feeler 11, 13 from the film upon completion of transport by the length of a frame. It is also within the purview of the invention to construct and mount the input member 1 in such a way that the diaphragm 200 can be deformed or that the shutter including the element 15 can be opened only when the input member returns to the starting position of FIG. 1 upon completion of transport of the film 107 by the length of a frame. This can be achieved by mounting on or connecting the input member 1 with a blocking device which allows the element 15 to leave the solid-line position of FIG. 1 only when the input member 1 reassumes ita starting position by moving from the second intermediate position under the action of the spring 105.

The stop 12d and the cam face 12e of the arresting lever 12 constitute a safety device which becomes effective if the parts of the camera are not constructed and/or mounted with a high degree of precision, for example, when the parts 14, 15, 14b and 13a are mounted with certain tolerances. The cam face 12e then prevents repeated back and forth movements of the input member 1 upon or shortly prior to completion of movement to the second end position and/or a blocking of any movements of mobile parts as follows: If the element 15 of the shutter failed to return to the solid line position of FIG. 1 when the input member 1 reaches its second end position, i.e., if the element 15 failed to return the lever 14 to the solid-line position of FIG. 1, the arresting lever 12 assumes an angular position in which the cam face 12e is located in the path of and steers the lug 14b of the lever 14 into a notch 12k below the stop 12d. The tooth 14a then engages the adjacent tooth of the positioning member 10 and holds the latter against movement in a clockwise direction. The user notes that the input member 1 is held against movement to the first intermediate position and continues to move the input member in the direction indicated by arrow 104 so that the element 15 assumes the solid-line position of FIG. 1 and disengages the tooth 14a from the positioning member 10 which enables the spring 105 to move the input member to the first intermediate position. During such movement of the input member 1, the cam face 12e abuts against the lug 14b and prevents the arresting lever 12 from moving its tooth 12c into engagement with the positioning member 10 so that the latter ddoes not interfere with movement of the input member 1 under the action of the spring 105.

The cam face 12f becomes effective if the input member 1 is moved from its starting position during the making of an exposure and to such an extent that the arresting lever 12 moves its tooth 12c into engagement with the positioning member 10. The cam face 12f then moves into the path of the lug 14b and maintains the tooth 14a out of engagement with the positioning member 10. It will be recalled that the spring 112 is free to pivot the lever 14 clockwise in response to actuation of the camera release including the diaphragm 200 because the element 15 of the shutter then moves to the phantom-line position of FIG. 1. The cam face 12f then enables the input member 1 to return to the starting position of FIG. 1 under the action of the spring 105 upon completion of the exposure.

It will be recalled that the disengaging stud 10a pivots the arresting lever 12 counterclockwise while the input member 1 approaches its starting position to thereby disengage the tooth 12c from the positioning member 10. As the disengaging stud 10a bears against the follower 12h to maintain the arresting lever 12 in the angular position of FIG. 1, the tooth 12a of the arresting lever engages the portion or lug 13b of the feeler 11, 13 to thus insure that the tip 11A is spaced apart from the leading and trailing edges of the perforation 107a into which the tip 11A extends. Thus, the parts 11, 12 and 13 cannot influence the position of the foremost unexposed film frame when the user actuates the camera release to make an exposure. The tip 11A remains in the adjacent perforation 107a during the making of an exposure to thus insure that the film 107 can pivot the feeler 11, 13 counterclockwise, as viewed in FIG. 1, when the input member 1 is caused to leave its starting position. It is to be understood that the maximum dimension of the tip 11A (as viewed in the direction of arrow 211) is at least slightly less than the length of a perforation 107a in the film 107 so that the portions 12a, 13b of the arresting lever 12 and feeler 11, 13 can center the tip 11A in the aforedescribed manner when the stud 10a disengages the tooth 12c from the positioning member 10 in response to completion of movement of the input member 1 to the starting position of FIG. 1.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, particularly in a still camera for use with photographic roll film having a row of perforations, one for each film frame, a combination comprising a housing having a chamber for a supply of film; film transporting means having input means movable back and forth and operative to advance the film in said housing lengthwise in response to movement in a predetermined direction; positioning means movable in said housing in response to operation of said input means; a feeler arranged to engage the film in said housing and to penetrate into an oncoming perforation of the film; arresting means movably installed in said housing and arranged to arrest said positioning means in response to penetration of said feeler into said oncoming perforation upon completion of film transport by the length of a frame, said input means being movable counter to said predetermined direction; and means for disengaging said arresting means from said positioning means in response to movement of said input means counter to said predetermined direction.

2. A combination as defined in claim 1, wherein said arresting means comprises means for centering said feeler in the perforation into which said feeler extends in response to disengagement of said arresting means from said positioning means.

3. A combination as defined in claim 2, wherein said feeler comprises a first portion and said centering means comprises a second portion provided on said arresting means and engaging said first portion in response to disengagement of said arresting means from said positioning means to thereby maintain said feeler in a predetermined position with respect to that perforation into which said feeler extends.

4. A combination as defined in claim 3, wherein said feeler is spaced apart from the leading and trailing ends of said last mentioned perforation in said predetermined position of said feeler.

5. A combination as defined in claim 1, wherein said positioning means is rotatable in said housing and has an annulus of teeth, said input means having means for rotating said positioning means by way of said teeth in response to movement in and counter to said predetermined direction, said means for disengaging said arresting means being provided on and being movable by said positioning means.

6. A combination as defined in claim 5, wherein said input means is repeatedly movable in said predetermined direction and said arresting means comprises a follower which is engaged by said disengaging means while said input means assumes a starting position prior to a first movement in said predetermined direction, and further comprising control means provided in said housing and arranged to extend into the path of movement of said disengaging means toward said follower while said input means moves counter to said predetermined direction subsequent to completion of said first movement thereof.

7. A combination as defined in claim 6, further comprising means for yieldably coupling said control means to said arresting means so that said control means also extends into the path of and is displaced by said disengaging means during said first movement of said input means from said starting position.

8. A combination as defined in claim 7, wherein said arresting means comprises means for moving said control means out of the path of said displacing means in response to engagement of said arresting means with said positioning means so that said displacing means can bypass said control means during movement of said input means counter to said predetermined direction subsequent to a second movement of said input means in said predetermined direction whereby said displacing means is free to engage said follower and to disengage said arresting means from said positioning means upon completion of movement of said input means back to said starting position.

9. A combination as defined in claim 1, wherein said feeler comprises a portion which extends into the path of movement of said arresting means into engagement with said positioning means when said feeler does not extend into a perforation.

10. A combination as defined in claim 9, further comprising means for expelling said feeler from the adjacent perforation in response to start of operation of said input means to advance the film by the length of a frame and for thereby placing said portion of said feeler in the path of movement of said arresting means into engagement with said positioning means.

11. A combination as defined in claim 9, wherein said arresting means comprises a recess for said portion of said feeler, said portion being in register with and being receivable in said recess in response to penetration of said feeler into an oncoming perforation whereby said arresting means is free to engage said positioning means.

12. A combination as defined in claim 11, wherein said input means is arranged to move said feeler through a predetermined distance by way of the advancing film subsequent to penetration of said feeler into an oncoming perforation to thereby place said portion of said feeler into register with said recess.

* * * * *